(12) United States Patent
Fuller et al.

(10) Patent No.: US 8,511,828 B2
(45) Date of Patent: Aug. 20, 2013

(54) IMAGE PROJECTION ON DYNAMIC WATER MIST SCREEN

(75) Inventors: Mark Fuller, Toluca Lake, CA (US); James Doyle, Burbank, CA (US)

(73) Assignee: Wet Enterprises, Inc., Sun Valley, CA (US)

( * ) Notice: Subject to any disclaimer, the term of this patent is extended or adjusted under 35 U.S.C. 154(b) by 229 days.

(21) Appl. No.: 13/172,713

(22) Filed: Jun. 29, 2011

(65) Prior Publication Data

US 2012/0019784 A1  Jan. 26, 2012

Related U.S. Application Data

(60) Provisional application No. 61/359,799, filed on Jun. 29, 2010.

(51) Int. Cl.
*G03B 21/53* (2006.01)
*G03B 21/14* (2006.01)

(52) U.S. Cl.
USPC ............. 353/28; 353/10; 353/79; 359/449; 359/458; 352/86; 239/18

(58) Field of Classification Search
USPC ............. 353/10, 28, 79; 239/18; 352/86; 359/458, 449, 462–478
See application file for complete search history.

(56) References Cited

U.S. PATENT DOCUMENTS

| | | | | |
|---|---|---|---|---|
| 3,334,816 | A * | 8/1967 | Mizuno | 239/18 |
| 5,067,653 | A * | 11/1991 | Araki et al. | 239/18 |
| 5,265,802 | A * | 11/1993 | Hobbs et al. | 239/18 |
| 5,270,752 | A * | 12/1993 | Kataoka et al. | 353/28 |
| 5,368,228 | A * | 11/1994 | Adamson et al. | 239/18 |
| 5,445,322 | A * | 8/1995 | Formhals et al. | 239/18 |
| 6,819,487 | B2 * | 11/2004 | Palovuori et al. | 359/443 |
| 2011/0285964 | A1 * | 11/2011 | Reichow | 353/10 |

* cited by examiner

*Primary Examiner* — William C Dowling
(74) *Attorney, Agent, or Firm* — Blakely Sokoloff Taylor & Zafman LLP

(57) ABSTRACT

A multimedia presentation system a projector to project images toward an audience. A plurality of nozzles are partially submerged in a body of water at locations between the projector and the audience. The plurality of nozzles are located at different distances from the projector. Each of the plurality of nozzles is arranged to produce a fan like water mist onto which the projector projects images. A controller is coupled to the projector and the plurality of nozzles. The controller causes the projector to project images and at least one of the plurality of nozzles to produce a water mist in a synchronized sequence such that the images appear at different distances from the projector at different times. The controller may further control the orientation of each nozzle to vary the distance by inclining the plane of the water mist relative to the surface of the body of water.

21 Claims, 4 Drawing Sheets

IMAGE PROJECTION ON DYNAMIC WATER MIST SCREEN

This application claims the benefit pursuant to 35 U.S.C. 119(e) of U.S. Provisional Application No. 61/359,799, filed Jun. 29, 2010, which application is specifically incorporated herein, in its entirety, by reference.

BACKGROUND

1. Field

Embodiments of the invention relate to the field of visual displays; and more specifically, to projected images on water mists.

2. Background

Water features may be provided as dramatic focal points for sites such as hotels, amusement parks, and shopping centers. Such water features may be part of a multimedia presentation that becomes a destination attraction at the times when the show is presented. The multimedia presentation may include still or moving images that are projected on sheets of water mist created by the water feature. Such multimedia presentations are becoming increasingly elaborate as sites compete with one another to provide shows that attract an audience. It would be desirable to create a water feature that provides a multimedia presentation that is distinctly different from other such presentations and creates dramatic effects that are impressive and memorable to the audience.

SUMMARY

A multimedia presentation system a projector to project images toward an audience. A plurality of nozzles are partially submerged in a body of water at locations between the projector and the audience. The plurality of nozzles are located at different distances from the projector. Each of the plurality of nozzles is arranged to produce a fan like water mist onto which the projector projects images. A controller is coupled to the projector and the plurality of nozzles. The controller causes the projector to project images and at least one of the plurality of nozzles to produce a water mist in a synchronized sequence such that the images appear at different distances from the projector at different times. The controller may further control the orientation of each nozzle to vary the distance by inclining the plane of the water mist relative to the surface of the body of water.

Other features and advantages of the present invention will be apparent from the accompanying drawings and from the detailed description that follows below.

BRIEF DESCRIPTION OF THE DRAWINGS

The invention may best be understood by referring to the following description and accompanying drawings that are used to illustrate embodiments of the invention by way of example and not limitation. In the drawings, in which like reference numerals indicate similar elements.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

Figure 1:
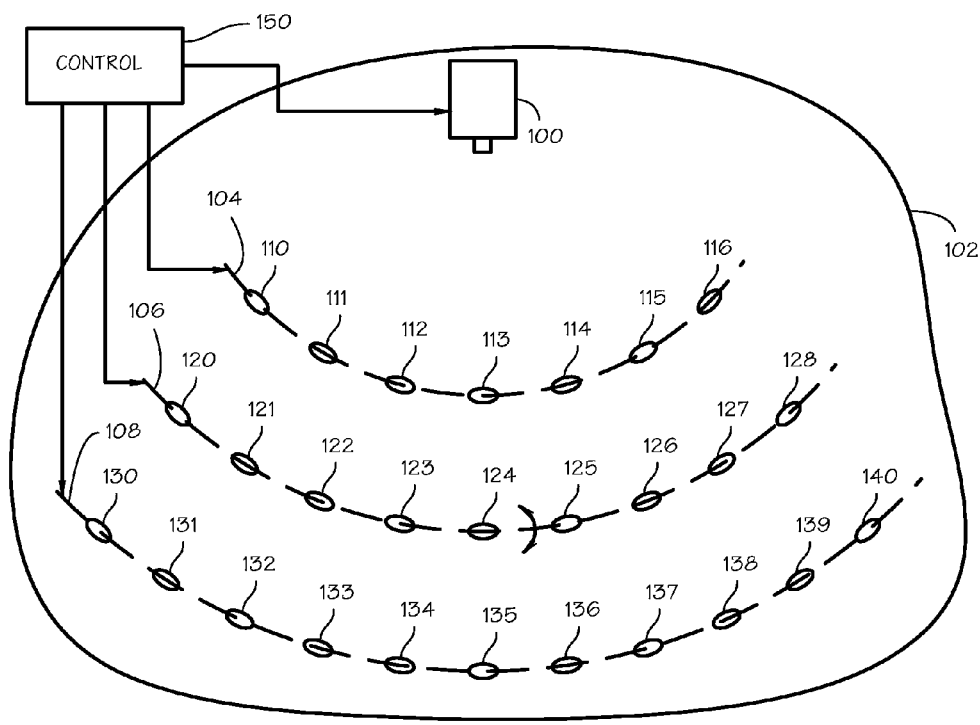
FIG. 1 is a plan view of a water feature that embodies the invention.

FIG. 1 is a plan view of a water feature that embodies the invention. An image projector 100 is located on or near a pool of water 102 and oriented so that it projects an image toward a viewing audience. A plurality of nozzles 110-116, 120-128, 130-140 are located within the pool of water 102. The nozzles are able to produce a fan like spray of water mist that provides a rear projection screen on which the projector 100 projects an image. A water mist will scatter light that is projected into it so that it acts as a translucent surface. A mist screen with an appropriate density and size of water droplets can provide a relatively high quality projection surface.

As can be seen in FIG. 1, the nozzles 110-116, 120-128, 130-140 are located in groups 104, 106, 108 that are at various distances from the projector 100. A controller 150 is coupled to the projector 100 and the nozzles 110-116, 120-128, 130-140. The controller 150 causes the projector to project images and causes at least one of the plurality of nozzles to produce a water mist in a synchronized sequence such that the images appear at different distances from the projector at different times. For example, the controller 150 can cause a nozzle that is closest to the projector 100, such as the nozzle designated by reference numeral 113, to produce a mist screen and cause the projector to project an image intended to be at a distance from the audience. At a later time the controller 150 can cause a nozzle that is further from the projector 100, such as the nozzle designated by reference numeral 124, to produce a mist screen and cause the projector to project an image intended to be closer to the audience. In a similar manner the controller 150 can later causes an image to be projected on a mist screen that is still further from the projector, such as a screen produced by the nozzle designated by reference numeral 135. With an appropriate choice of image material the illusion of an object approaching the audience may be created.

It will be appreciated that the illusion of an object moving away from the audience can be created with the reverse of the sequence described above. Of course it is possible to produce much more elaborate effects by using more of the nozzles provided in sequences that move both forward and backward and side to side, possibly using multiple nozzles at the same time to create larger screens.

Figure 2:
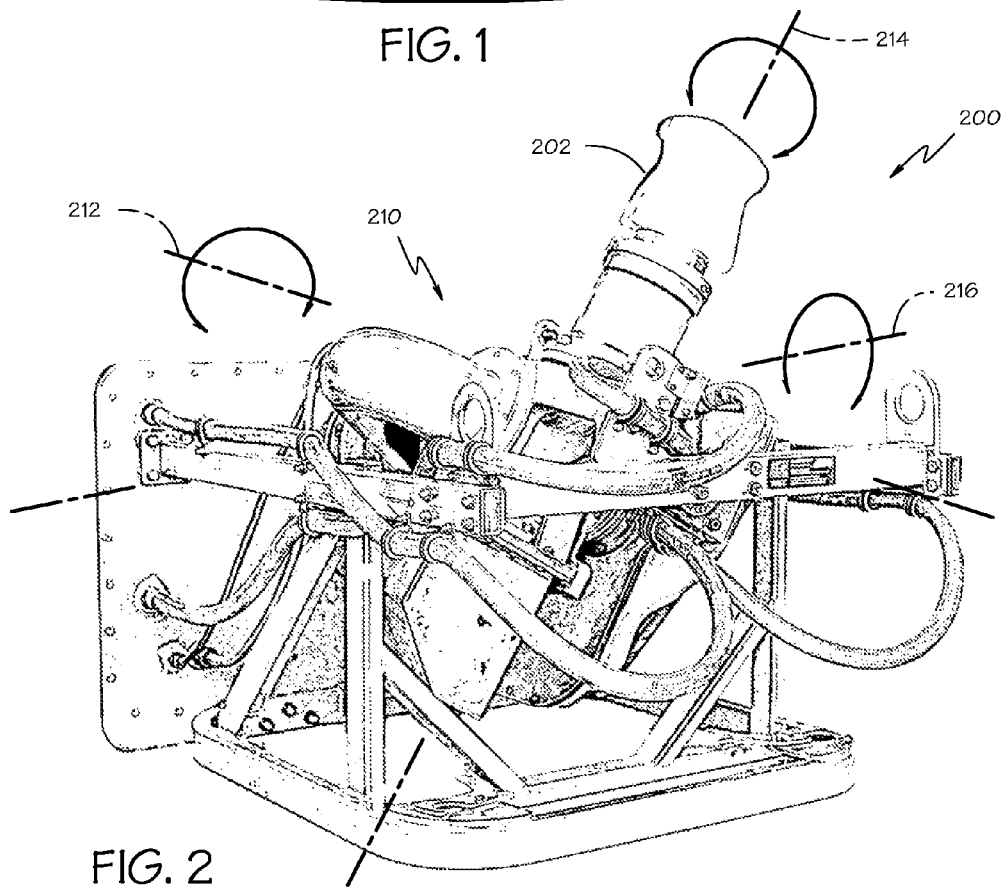
FIG. 2 is a pictorial view of a robotic nozzle that may be used in an embodiment of the invention.

FIG. 2 is a pictorial view of a robotic nozzle 200 that may be used in an embodiment of the invention. The robotic nozzle 200 includes a fan forming outlet 202 that ejects water in an upward direction to create a water mist screen. The outlet 202 is supported on a gimbal platform 210 that allows the orientation of the outlet to be rotated about two axes 212, 216. In other embodiments the gimbal platform may provide only a single axis of rotation. As suggested by the axis designated by reference numeral 214, the embodiment of the robotic nozzle 200 illustrated can adjust the rotational orientation of the fluid outlet 202. A fourth dimension of control is provided by adjustment of the water pressure supplied to the fluid outlet 202 which controls the height of the water mist produced. Using these four degrees of freedom, the controller 150 can produce highly dynamic moving water screens that can greatly enhance the impact of the projected images.

Figure 3:
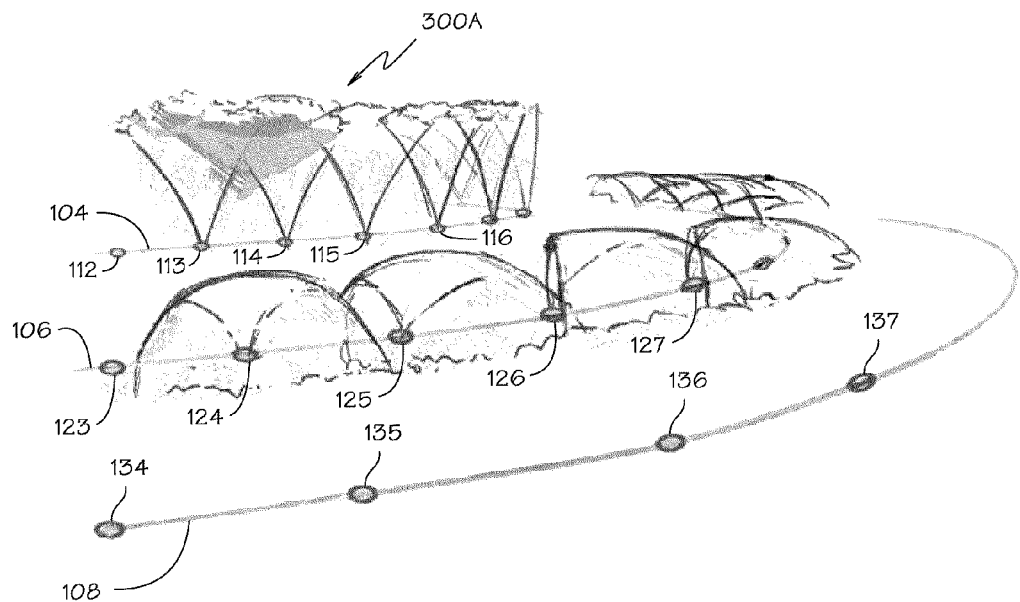
FIG. 3 is pictorial view of a multimedia presentation using an embodiment of the invention at a first point in time.

FIG. 3 is pictorial view of a multimedia presentation using an embodiment of the invention. At the point of time shown in this figure the controller 150 is causing the nozzles in the group designated by reference numeral 104 to produce a water mist screen. An image 300A, such as the illustrated image of a whale, is projected a controller coupled to the projector and the plurality of nozzles to cause the projector projects images and to cause at least one of the plurality of nozzles to produce a water mist in a synchronized sequence such that the images appear at different distances from the projector at different times which is at a great distance from the audience. Thus, and the illusion of a whale in the distance is created.

At this same point in time, the controller is also causing the nozzles in the group designated by reference numeral 106 to produce a water mist screen that is inclined away from the nozzles that are producing the water mist screen. In this way the mist screen produced by the nozzles that are further from the projector is below the sight line from the audience to the projected image 300A.

Figure 4:
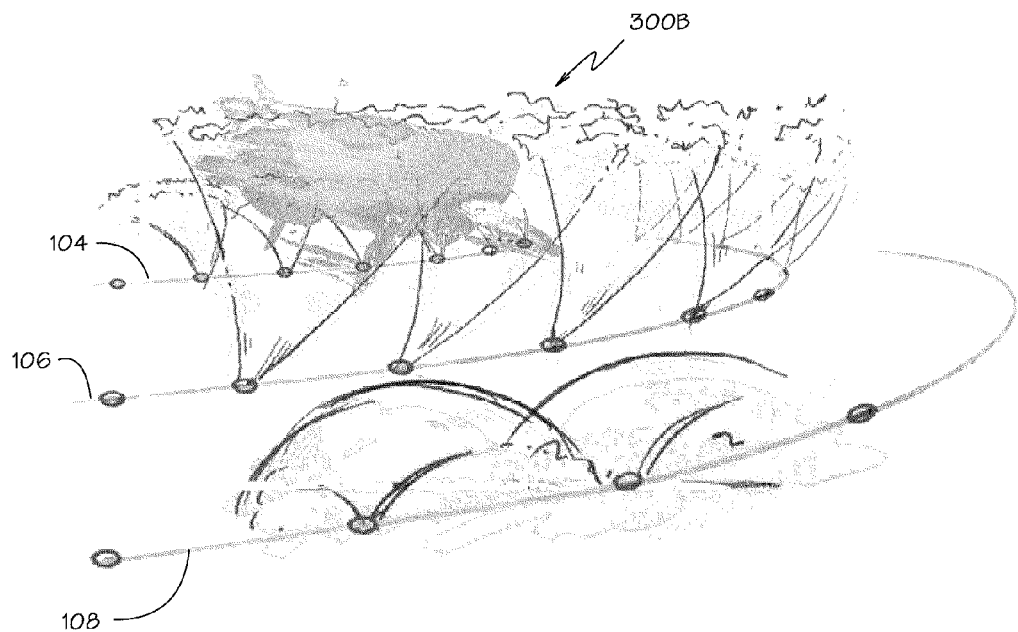
FIG. 4 is a pictorial view of the multimedia presentation at a second point in time.

FIG. 4 is a pictorial view of the multimedia presentation at a second point in time. At this time the controller 150 has caused the nozzles in the group designated by reference numeral 106 to rotate such that the water mist screen is raised to a height where the projector 100 can project an image 300B onto this second screen that is further from the projector. At the same time the controller 150 causes the nozzles in the group designated by reference numeral 104 to rotate such that the water mist screen they produce inclines away from the second screen sufficiently to lower the original screen below the level of the projected image 300B.

Rotating the nozzles to raise and lower the water mist screens may allow the screens to be raised and lowered more quickly than can be accomplished by adjusting the pressure to change the height of the water mist produced by the nozzles. The moving screens of water thus created may also contribute to the unique character of the multimedia presentation thus created. Since the height of the water mist screens may be greater than the distance between adjacent groups of nozzles, it may be necessary to rotate the nozzles to incline a lowered screen away from the nozzles producing an active raised screen. This prevents the lowered screen from interfering with the water mist created by the adjacent nozzles that are producing the active screen.

Figure 5:
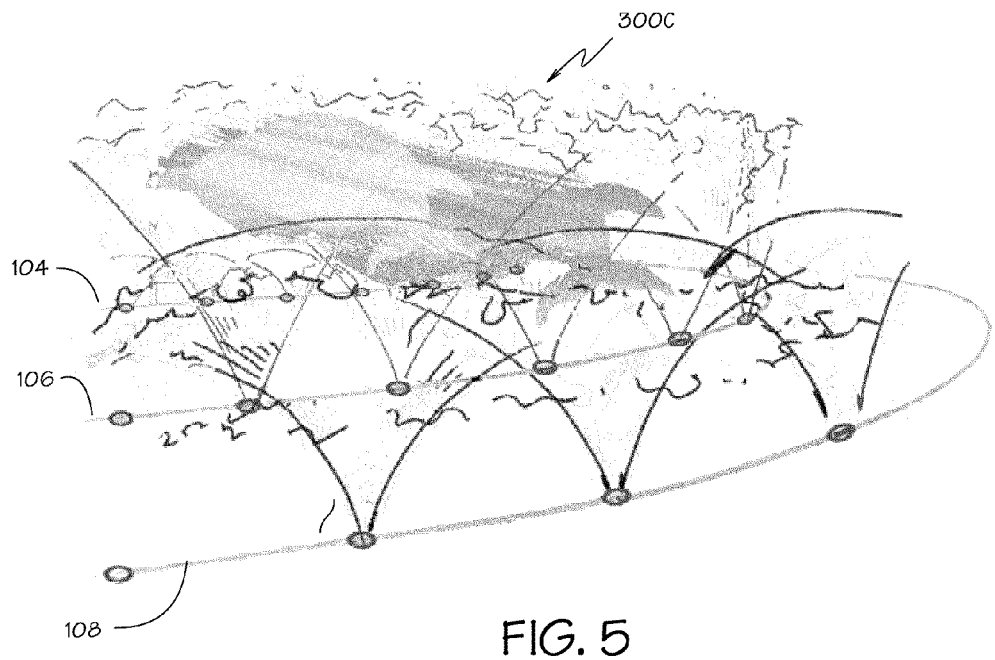
FIG. 5 is a pictorial view of the multimedia presentation at a third point in time.

FIG. 5 is a pictorial view of the multimedia presentation at a third point in time. At this time the controller 150 has caused the nozzles in the group designated by reference numeral 106 to rotate such that the water mist screen has moved forward away from the projector and towards the audience. Using a robotic nozzle 200 of the type described above, the controller 150 is able to control the nozzles such that the image can be moved to various distances from the projector in a smooth and continuous motion over a substantial distance. By coordinating changes in the position of a single water mist screen with a changing image 300C, striking and dynamic visual effects can be achieved.

Figure 6:
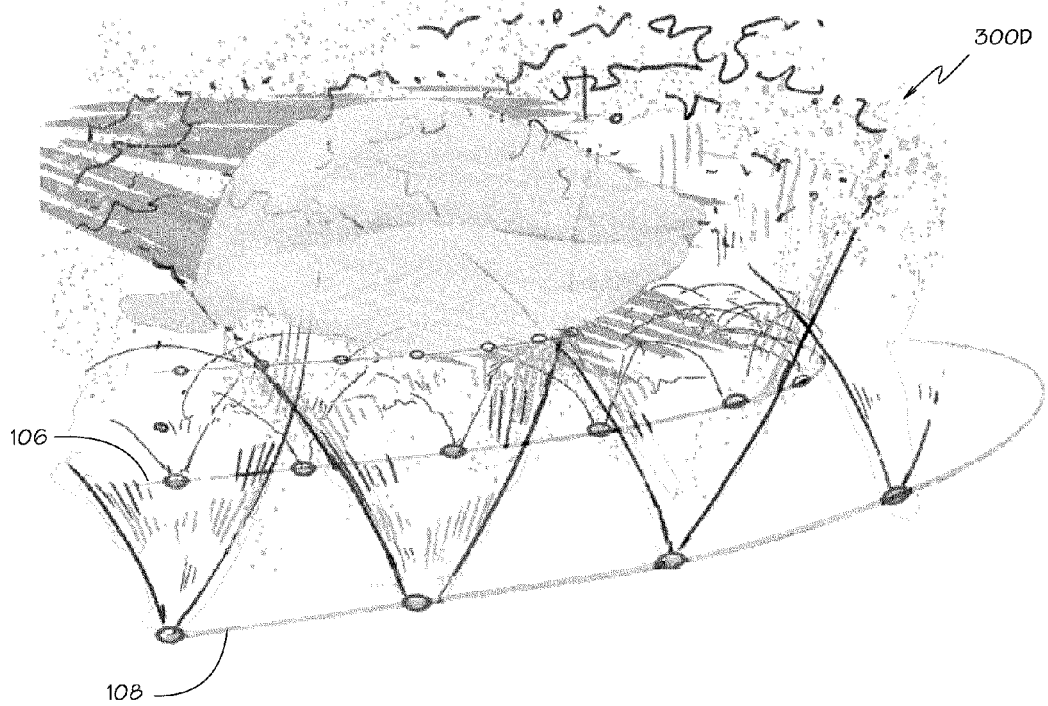
FIG. 6 is a pictorial view of the multimedia presentation at a fourth point in time.

FIG. 6 is a pictorial view of the multimedia presentation at a fourth point in time. At this time the controller 150 has created a water mist screen using the nozzles in the group designated by reference numeral 108, which in this embodiment is the group of nozzles furthest from the projector 100. In a similar manner to that described above the raising of the screen produced by the nozzles in the group designated by reference numeral 108 has been coordinated with the lowering of the screen produced by the nozzles in the group designated by reference numeral 106. It will be appreciated that the screen produced by the nozzles in the group designated by reference number 106 may have been rotated away from the projector such that the transition between the second and third screens is synchronized so that the projected image 300D is at substantially the same distance during the transition.

FIG. 7 through 10 are side elevations in which the operation of the nozzles described above may be seen more clearly.

Figure 7:
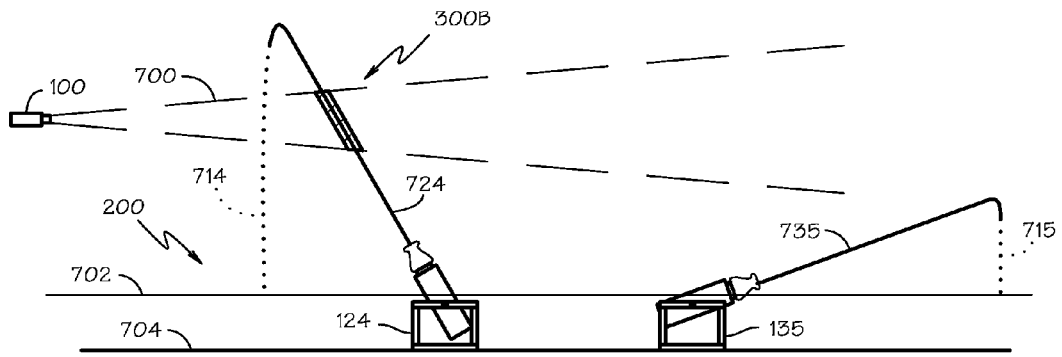
FIG. 7 is a side elevation of a portion of a water feature that embodies the invention in a first operative position.

FIG. 7 is a side elevation of a portion of the water feature in a first operative position that corresponds approximately to the multimedia presentation illustrated in FIG. 4. To robotically controlled nozzles 124, 135 are shown partially submerged in a body of water 200. The nozzle assemblies are secured to a bottom surface 704 of the body of water 200. The surface 702 of the body of water is at a level that obscures much of the mechanism of the robotic nozzle assemblies 124, 135 while allowing the outlet portion of the nozzle assembly to be above the surface when producing a water mist. The entire nozzle assembly may be beneath the surface 702 of the body of water 200 when the nozzle assembly is not being used.

The projector 100 projects an image 700 towards the audience. In the first operative position the nozzle 124 closest to the projector is producing a water mist screen 724 that is inclined toward the projector 100. An image 300B is produced where the projected image 700 passes through the water mist screen 724. It will be appreciated that there will be a secondary spray of water 714 as the water falls back into the pool 200 below because of the inclination of the nozzle. The secondary spray 714 may be more diffuse than the water mist screen 724 but it is likely that it will scatter the projected light 700 to some extent and produce a "ghost" image. Ideally the program material being projected will be designed to use such "ghost" images as part of the presentation. Embodiments of the invention are intended to produce a dynamic and somewhat abstract visual presentation rather than a highly detailed projected image.

The second nozzle 135 which is furthest from the projector 100 is inclined away from the first nozzle 124 so that the water mist 735 being produced by the second nozzle does not disturb the water mist 724 being produced by the first nozzle. The second nozzle 135 is inclined sufficiently that the water mist 735 is below the projected image 300B.

Figure 8:
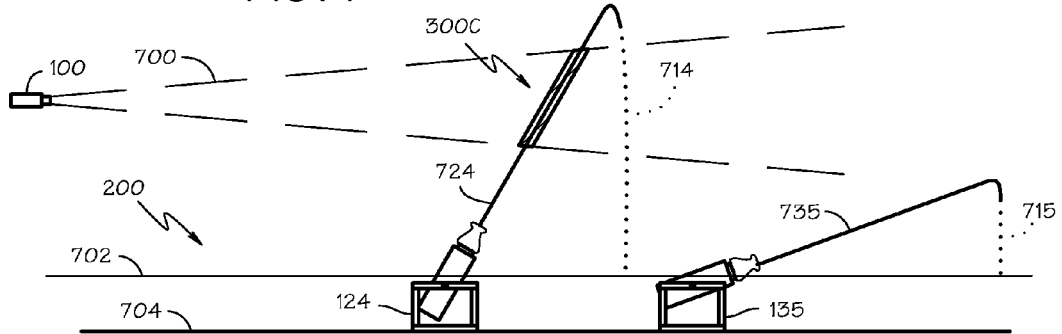
FIG. 8 is a side elevation of the water feature in a second operative position.

FIG. 8 is a side elevation of the water feature in a second operative position that corresponds to the multimedia presentation slightly before the presentation illustrated in FIG. 5. It will be seen that the first nozzle 124 has been rotated by the controller 150 such that the water mist screen 724 is now inclined away from the projector 100. The rotation of the nozzle 124 allows the distance of the water mist screen 724 from the projector 100 to be smoothly changed. It will be appreciated that the nozzle may be rotated toward and away from the projector as necessary to produce the desired effect of distance between the image 300C and the audience. When the water mist screen 724 is inclined away from the projector 100 the secondary spray 714 will be between the image 300C and the audience. It may be desirable to select rotations of the nozzle 124 that are either inclined toward or away from the projector 100 to place the secondary spray 714 as desired for artistic effect.

Figure 9:
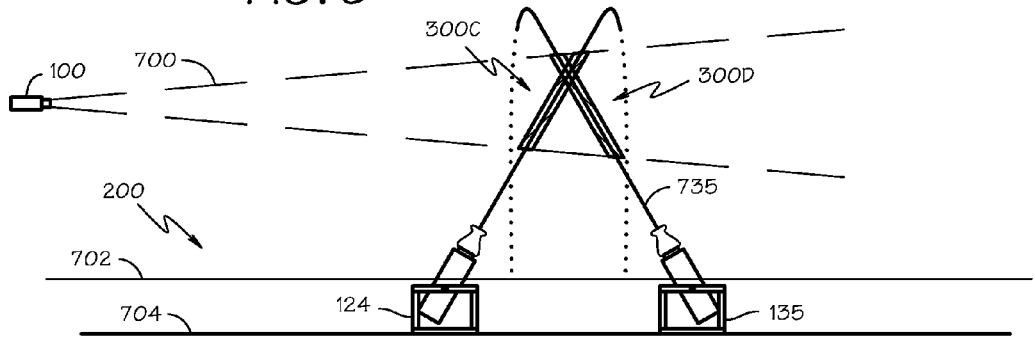
FIG. 9 is a side elevation of the water feature in a third operative position.

FIG. 9 is a side elevation of the water feature in a third operative position that corresponds to the multimedia presentation illustrated in FIG. 5. It will be seen that the second nozzle 135 has been rotated such that the water mist screen 735 produced by this nozzle is inclined toward the projector 100 and is creating an image 300D at approximately the same place as the image 300C produced by the first nozzle 124. This allows an image to be "handed off" from a first mist screen 724 to a second mist screen 735 to allow smooth changes of distance from the projector 100 that are greater than can be accommodated by the rotation of a nozzle. In this way the images can appear at different distances from the projector 100 that are substantially continuous from a first distance closest to the projector produced by the first nozzle 124 inclined toward the projector to a second distance furthest from the projector produced by the second nozzle 135 inclined away from the projector.

Figure 10:
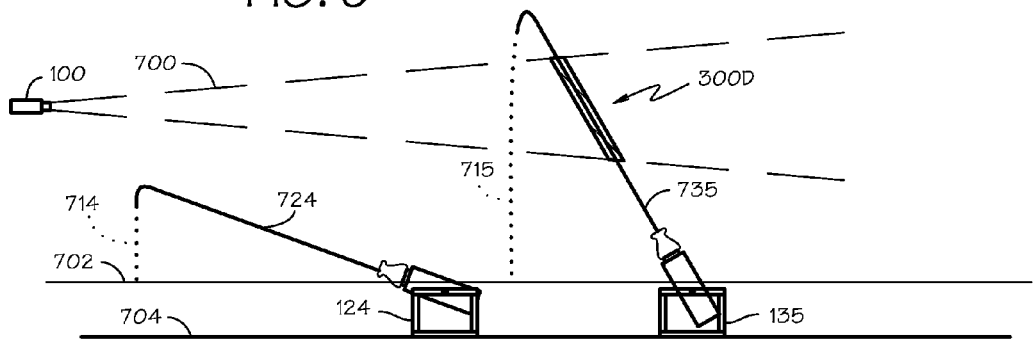
FIG. 10 is a side elevation of the water feature in a fourth operative position.

FIG. 10 is a side elevation of the water feature in a fourth operative position that corresponds to the multimedia presentation slightly after the presentation illustrated in FIG. 5. It will be seen that the first nozzle 124 has now been rotated toward the projector 100 sufficiently to lower the first mist screen 724 below the projected light 700. By rotating the first nozzle 124 toward the projector 100, it is also rotated away from the second nozzle 135 so that the mist screen 724 produced by the first nozzle does not interfere with the mist screen 735 produced by the second nozzle.

The controller 150 may cause the focus of the lens on the projector 100 to be adjusted according to the changing distance between the projector and the water mist either to maintain the focus of the image or to deliberately place the image out of focus.

The controller 150 may cause the focal length of the lens on the projector 100 to be adjusted according to the changing distance between the projector and the water mist to change the size of the image. Since the image will get larger as the distance between the projector and the water mist screen increases, it may be desirable to increase the focal length of the lens as the distance increases to counteract the effect of enlarging the image since the image will already appear to be larger since it is closer to the audience. Increasing the focal length as the distance between the projector and the screen increases will also present a dimming of the image due to an increase in the area of projection.

The controller 150 may cause the projector 100 to project images in different directions at different times. The changes in direction may be created by moving the projector or by moving an optical element, such as a mirror, that is in the optical path. The changes in direction of the image projection may be synchronized with the nozzles so that the mist screen is moving side to side as viewed by the audience to track the location of the image. This permits the image to cover a wider area than could normally be covered by the projector.

While certain exemplary embodiments have been described and shown in the accompanying drawings, it is to be understood that such embodiments are merely illustrative of and not restrictive on the broad invention, and that this invention is not limited to the specific constructions and arrangements shown and described, since various other modifications may occur to those of ordinary skill in the art. The description is thus to be regarded as illustrative instead of limiting.

What is claimed is:

1. A multimedia presentation system comprising:
   a body of water;
   a projector located to project images toward an audience;
   a plurality of nozzles partially submerged in the body of water at locations between the projector and the audience, the plurality of nozzles being located at two or more different distances from the projector, each of the plurality of nozzles arranged to produce a fan like water mist onto which the projector projects images; and
   a controller coupled to the projector and the plurality of nozzles to cause the projector that projects images and to cause at least one of the plurality of nozzles to produce a water mist in a synchronized sequence such that the images appear at different distances from the projector at different times.

2. The multimedia presentation system of claim 1, wherein the controller further controls the height of the water mist produced by the plurality of nozzles.

3. The multimedia presentation system of claim 1, wherein the plurality of nozzles are rotatable such that the fan like water mist can be inclined to vary the distance between the water mist and the projector, and wherein the controller further causes at least one of the plurality of nozzles to incline the water mist such that the images appear at different distances from the projector at different times.

4. The multimedia presentation system of claim 3, wherein the controller further causes at least two of the plurality of nozzles to produce and incline the water mists such that the images appear at different distances from the projector that are substantially continuous from a first distance closest to the projector produced by a first nozzle inclined toward the projector to a second distance furthest from the projector produced by a second nozzle inclined away from the projector.

5. The multimedia presentation system of claim 1, wherein the controller further causes the focus of a lens on the projector to be adjusted according to the changing distance between the projector and the water mist.

6. The multimedia presentation system of claim 1, wherein the controller further causes the focal length of a lens on the projector to be adjusted according to the changing distance between the projector and the water mist.

7. The multimedia presentation system of claim 1, wherein the controller further causes the projector to project images in different directions at different times.

8. A method for a multimedia presentation comprising:
   projecting images over a body of water toward an audience;
   producing a plurality of fan like water mists onto which the images are projected, the water mists being above the body of water at two or more different distances from the audience; and
   synchronizing the projection of a sequence of images and production of a sequence of water mists such that the images appear at different distances from the audience at different times.

9. The method of claim 8, further comprising producing the plurality of water mists with various heights.

10. The method of claim 8, further comprising inclining the fan like water mist to vary the distance between the water mist and the audience.

11. The method of claim 8, further comprising means for inclining at least two of the water mists such that the images appear at different distances from the audience that are substantially continuous from a first distance furthest from the audience on a first water mist inclined away from the audience to a second distance closest to the audience on a second water mist inclined toward the audience.

12. The method of claim 8, further comprising focusing the image according to the changing distance between the audience and the water mist.

13. The method of claim 8, further comprising adjusting a focal length of a lens used to project the images according to the changing distance between the audience and the water mist.

14. The method of claim 8, further comprising projecting the images in different directions at different times.

15. A multimedia presentation system comprising:
- means for projecting images over a body of water toward an audience;
- means for producing a plurality of fan like water mists onto which the images are projected, the water mists being above the body of water at two or more different distances from the audience; and
- means for synchronizing the projection of a sequence of images and production of a sequence of water mists such that the images appear at different distances from the audience at different times.

16. The multimedia presentation system of claim 15, further comprising means for producing the plurality of water mists with various heights.

17. The multimedia presentation system of claim 15, further comprising means for inclining the fan like water mist to vary the distance between the water mist and the audience.

18. The multimedia presentation system of claim 15, further comprising means for inclining at least two of the water mists such that the images appear at different distances from the audience that are substantially continuous from a first distance furthest from the audience on a first water mist inclined away from the audience to a second distance closest to the audience on a second water mist inclined toward the audience.

19. The multimedia presentation system of claim 15, further comprising means for focusing the image according to the changing distance between the audience and the water mist.

20. The multimedia presentation system of claim 15, further comprising means for adjusting a focal length of a lens used to project the images according to the changing distance between the audience and the water mist.

21. The multimedia presentation system of claim 15, further comprising means for projecting the images in different directions at different times.

* * * * *